Oct. 13, 1942.  L. HOLLAND-LETZ  2,298,621
ELECTRICAL STEP MOTOR UNIFORM STEP MOVEMENT
Filed March 21, 1940
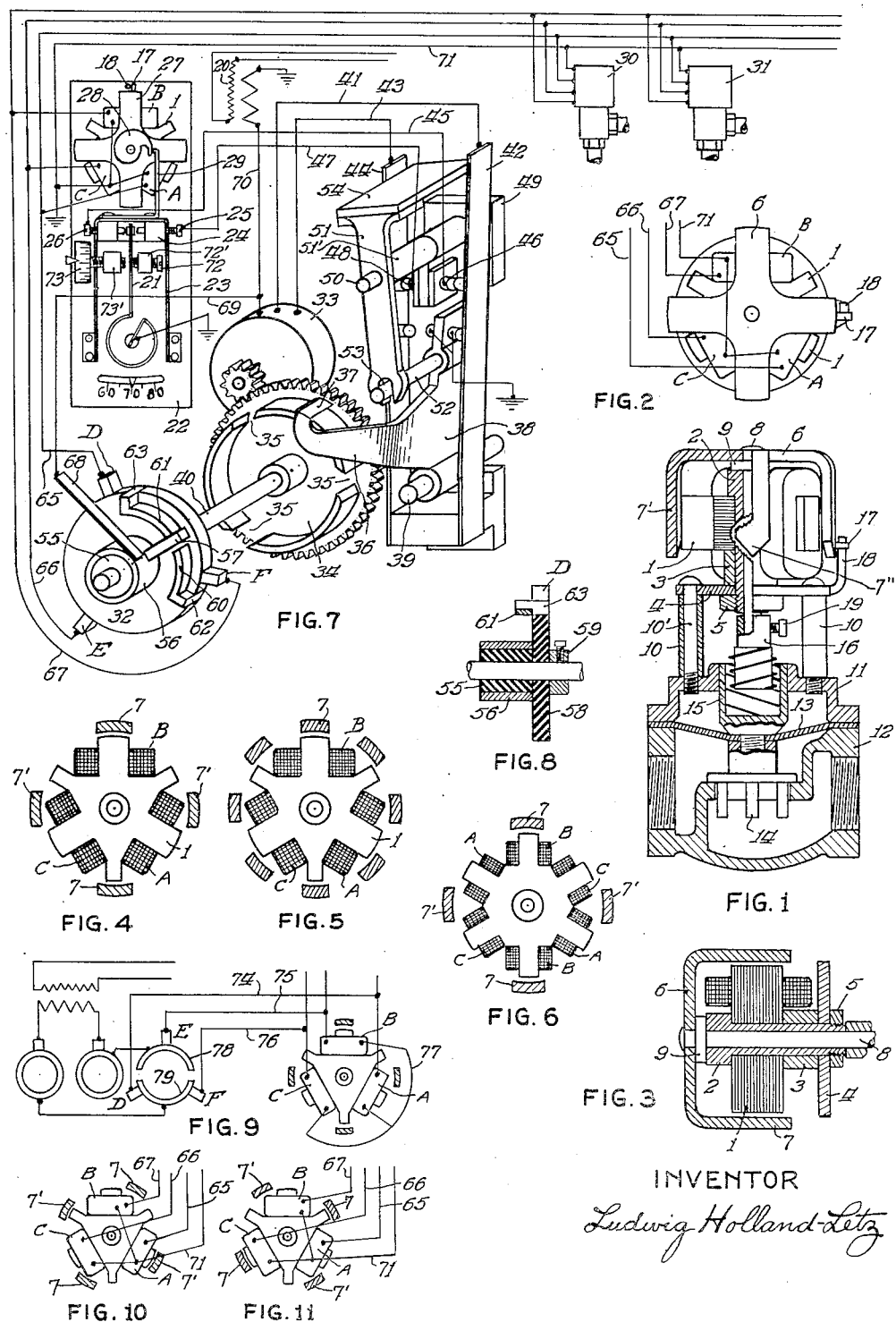
INVENTOR
Ludwig Holland-Letz Patented Oct. 13, 1942

2,298,621

UNITED STATES PATENT OFFICE 2,298,621

ELECTRICAL STEP MOTOR UNIFORM STEP MOVEMENT

Ludwig Holland-Letz, Crown Point, Ind.

Application March 21, 1940, Serial No. 325,156

6 Claims. (Cl. 172—239)

The present invention relates to uniform step by step motion consummated electrically between separate isolated devices whereby accurate synchronous movement is transmitted, especially significant where back and forth uniform unison step movement between limits is essential.

One of the principal objects of this invention provides for a small compact powerful step motor, less bulky for equal power torque when compared with conventional step motors; this has been accomplished through the use of an external rotor. This external rotor adds very little to the step motor overall diameter beyond that of the magnetic stator field periphery, consequently the magnetic attractive force acting on the rotor at this greater distance from the center and at a proportionately longer arc of the angular step movement will produce a much greater torque, obviously when this is compared with inside rotor including side magnet rotor step motors that my external rotor step motor is far less bulky for equal power output and will result in forming a powerful, compact, efficient and simple step motor.

Another equally important object of this invention, makes provision for energizing step motors for attaining accurate sharply positioned equate distant steps, the elimination of rotor oscillation, overrun or spin; attained through the use of a selector energizing distributor switch which energizes only one pair of stator poles, of an annular type step motor; thus attracting only one pair of rotor bars or arms to register squarely over the energized stator poles, while the other stator poles are actively dead; these dead stator poles can therefore not cause countermagnetic attractions, oscillations or overruns, and thereby avoiding the various shunt resistances, condensers and other steadying means and the whole step motor system simplified and made reliable.

A further object of this invention makes provision, for energizing different single consecutive step motor stator poles through uniform steps for reverse movement, accomplished through the use of a member within the energizing distributor switch for selecting a different consecutive series of stator poles upon reverse movement of the driven distributor switch; thereby constantly keeping uniform accurate back and forth step movement synchronously operating between predetermined limits for the separated step motor operated devices energized from a driven distributor switch.

In my pending patent application Serial No. 148,091 filed June 14, 1937, I show an electromagnet propelled ratchet reversing step motor for keeping a thermal cooperating contact member synchronously in retreat moving with a uniform step producing power device, the latter operating a circuit distributing switch having a member for selecting and energizing a certain electromagnet for reverse movement of the step motor to conform with the distributor switch operating direction.

Obviously many important uses await a reliable step by step motion; among these, is a certain automatic heat regulator, here regulation movement consists of a series of uniform steps operating back and forth between predetermined limits is utilized for keeping the thermostat in perfect time with the uniform step producing power device; obviously any number of step motors may be used in that same distributing switch circuit, these might be operating valves for radiators or regulating the flow of fuel, gas, etc., for heating, all controlled by the one thermostat and all working in perfect step with one another.

To further describe my invention more fully reference will be made to the accompanying drawing, in which:

Figure 1 of the drawing illustrates a partial cross section of my step motor mounted over a valve operatively connected therewith by screw threads to the valve stem.

Figure 2 shows a top outline view of the step motor of Figure 1 with the field coils shown wired in diagram.

Figure 3 is a longitudinal cross sectioned view through the center of rotor and field coils of view Figure 2.

Figure 4 is a transverse cross section through the rotor and field coils of Figure 2 which is a four bar rotor.

Figure 5 is a transverse cross section through the rotor of an eight bar rotor otherwise same as Figure 4.

Figure 6 is a transversed cross section of a 6 coil stator shown for comparative reasons. It is shown within the same inside diameter of rotor as of Figures 4 and 5.

Figure 7 shows a small step motor mounted in a thermostat for operating the thermal contact separation cooperating movement made during each step, of the step producing power device, operating a step motor distributor switch; also showing the wiring diagram to the thermostat step motor and the circuit to the valve regulating step motors.

Figure 8 is a longitudinal cross section through the distributor switch disc at the contact bar.

Figure 9 is a circuit diagram of the ordinary well known circuit distributor shown wired to my step motor.

Figures 10 and 11 are cross sections showing the two intermediate angular positions of the rotor completing one revolution of the circuit distributor as is shown in Figure 7.

In Figure 1 of the drawing a valve is shown equipped with my step motor. It is shown regulating the opening position of the valve to any of a series of uniform stop positions operating back and forth between the predetermined opened and its closed limits, thereby keeping the valve constantly adjusted to the proper opening; the construction shown has been chosen for its simple illustrative purposes, the valve adjusting mechanism has no particular significance, it is shown as screw thread operated and obviously may be a pinion and rack or gear quadrant and crank, cam, etc.

The step motor shown having an external rotor, it is of the annular type construction having a soft iron laminated stator 1, for compact construction reasons a three coil consequent pole stator has been chosen and is here shown having three pair of poles, three coils are used and are marked A, B and C, the stator is provided with a center aperture for receiving a shouldered sleeve 2 and a spacer sleeve 3 and then enters an aperture in motor plate 4 and by the aid of a nut 5 in threaded engagement with the end of the shouldered sleeve the laminated stator is securely held together and down to the motor plate.

A rotor 6, formed of soft iron, is shown having four depending arms of equal annular spacing and projecting at right angles from the radial face thereby forming a U, for spanning a pair of radially aligned poles and thereby closing the magnetic path between the energized pair of poles shown in Figure 3, a shaft 8 having a flange 9, passes through an aperture in the central axis of the rotor and is secured thereto, the shaft with the rotor attached is then placed in the stator sleeve 2 where it can revolve freely.

The step motor is then mounted over a valve with the motor plate 4 interposed by sleeve posts 10 and by the aid of screws 10' is mounted and secured upon a valve cap 11 which rests upon a valve body 12 separated by a sealing diaphragm 13 the valve body and cap are held together secured by means not shown, the valve operating screw 16 which is in threaded engagement with the cup shaped nut 15 is mounted and secured on the motor shaft. Nut 15 and disc 14 are separated by seal diaphragm 13 and secured by screw thread.

The rotor of this valve operating step motor is arranged to have a limited movement of one revolution, when a four arm rotor is used and energized with my selector distributor switch it will produce 12 equally divided steps, to limit its rotating movement to one revolution a stop pin 17 projects from one of the rotor arms and engages a stop finger 18 projecting upward from the motor plate an integral part thereof; the stator is now angularly positioned so that one of the rotor arms aligns directly over a pair of stator poles which is then secured with the aid of nut 5, and at the same time the valve disc 14 should be resting upon the valve seat for the closing position, the stops thereby prevent a too tight a closure, the screw 19 in the valve operating screw 16 secures it to the motor shaft 8.

The step motor external rotor arms depending from a radial portion are shown with its ends terminating to a symmetrical angular V point 7'' in parallel alignment with its center line, this serves to increase its sharp rigid centering ability over the respective stator poles. These rotor arms are of an arcuated cross section conforming closely with the periphery of the stator poles for traversing this external magnetic field.

The stator of this step motor is shown as a three coil consequent pole design (3 pair of poles construction) this represents a very compact and simple construction, one of these coils will contain more copper than two coils of the six coil construction shown very clearly for comparison in Figure 6, the rotor diameter in Figures 2, 3, 4, 5, and 6 are all shown to the same scale dimension.

In Figure 7 is shown an automatic heat regulator in which I employ my new step motor, one in the thermostat and two step motor operating valves, all these are operated from my circuit selector distributing switch. This regulator operates through a series of uniform steps back and forth between predetermined limits as above stated and since this design has been filed in another copending application it will here be only briefly described.

This automatic heat regulator is made for low voltage employing a transformer 20, a bimetal thermal member 21 is mounted and also grounded to a base member 22, a U shaped swinging frame member 23 is secured to base member at its open end so as to swing laterally through a parallel path at its closed end to which an insulating bifurcated terminal block 24 is secured, this block carrying terminal screws 25 and 26. A small step motor 27 constructed same as described in Figures 1 and 2, but smaller, is mounted to the thermostat base 22, the shaft 8 of this motor is lengthened above the rotor to receive a spiral cam 28 and secured against rotation, a follower arm 29 riding the cam and secured to the upper end of U frame 23 which is sprung so as to cause the follower to carry the sprung U frame resting on the cam 28.

The step producing power device, which is shown as part of Figure 7 in the schematic perspective diagram, is powered by a reversing motor 33, its purpose is primarily for operating the distributor switch for energizing the step motors of this heat regulator, one of these step motors is operating the retreating movement for separating the responsive element contact, and several are shown operating valves 30—31. This power device operation is through a series of uniform steps as above stated. The motor 33 is shown driving an indexing cam ring 34 through a pinion and gear, this cam ring which is an integral part of the gear is provided with three equally spaced interruptions or diagonally cut openings which form neutral positions 35, both opposing edges of these openings follow the same angular tangent lines and thereby form an inside and an outside sharp wedge like opposing edged cam path, and forming a cam path on the inside and the outside surfaces of this indexing cam for sliding support of a finger 37 projecting at right angles parallel to the ring cam axis, this finger 37 is a right angle extension of arm 36 the latter being also a right angle extension of switch rocker 38, the finger 37 having a cross section considerably narrower than the width of the neutral opening 35 and having its opposite edges shaped to conform with the edges of the ring cam openings so that when the ring cam is rotated in one direction the finger 37 is forced inward and when rotated in the other direction the finger is forced outward, the switch rocker 38 rocking on shaft 39 which is supported in a suitable housing is not shown, the ring cam gear 34, shaft 40 and the motor 33 are also both supported in a suitable manner in the housing not shown. It will now be seen that if the motor is rotated so that the ring cam 34 is rotated counter-clockwise, as shown, the switch rocker 38 will move clockwise, and when the ring cam is rotated clockwise the switch rocker will move counter-clockwise.

Tracing the circuit from the reversing motor 33 for operating in one direction, line 41 leads to terminal leaf spring conductor 42, and for the opposite motor operating direction the line 43 leads to terminal leaf spring conductor 44. The bimetal thermal member 21 cooperating with contact screw 26 is in circuit through lead 45 with terminal 46 and screw 25 in circuit through lead 47 to terminal 48, switch arm 38 grounds leaf spring 42 when it moves to the right and leaf spring 44 when it moves to the left as it is clearly shown.

A terminal block 49 supports an extension pivot 50 upon which is pivoted a throw out rocker 51 provided with an extension sleeve bearing 51' the end of the rocker is provided with a slot 53 for engaging switch extension pin 52, at the upper end of the rocker 51 and set at right angles is a plate 54 made of insulating material, it is secured to the rocker serving to move the leaf springs 42 or 44 away from the terminals 46 or 48 when the pin 52 is swung by the switch rocker 38.

To describe the operation of this step producing power device it must first be understood that the ring cam 34 as here shown is rotating now counter-clockwise and when it has revolved further so that the next ring cam neutral opening reaches the finger 37, the leaf spring 42 with the aid of the throw out rocker 51 and plate 54, will force the switch rocker 38 back to the neutral position, breaking the ground contact with the terminal leaf spring 42, which will then cause both terminal leaf springs 42 and 44 to make contact with their respective terminals 46 and 48, and then be ready to receive another signal from the bimetal thermal member 21, and if none is awaiting it the power device will come to a stop.

A contactor arm 57 which is integral with a sleeve 56 and is provided with an insulating bushing 55 is mounted and secured to a ring cam shaft 40, a selector distributor disc 58 made of nonconducting material is mounted upon the shaft 40 so as to rotate freely and is supported against lateral swing by collar 59, the distributor disc 58 is provided with two opposing contact segments 60 and 61, a rectangular portion of 62 and 63 integral with these segments which are imbedded in slots of the distributor disc so that they come flush at the periphery and thereby forming a smooth surface having two contacts at a 120 degree spacing; if with the contact arm 57 acting as a driver for the selector distributor disc which is positioned so as to be interposed by segments 61 and 62 and provided with some angular play between the segments then this driving contact will cause a circuit on the drive side of contact arm 57 only. Brushes D, E and F are secured to a housing, not shown, these are mounted in a suitable yieldingly pressured manner disposed around the distributor disc 58 in a 120 degree spacing and in an angular position so that when the brushes are in alignment with the contacts 62 and 63 the finger 37 will be resting about midway between the two neutral positions (ring cam openings); the friction caused by the brushes will hold 57 firmly against segment of 60 or 61 for making circuit. The brush D is provided with lead 65 to the step motor 27 to coil A, brush E is provided with lead 66 to coil C, and brush F is provided with lead 67 to coil B, brush 68 contacting 56 and leads 69 and 70 to the transformer 20 which is grounded, lead 71 is the ground circuit for the step motors.

The thermostat bimetal thermal member 21 lateral movement range resulting from temperature change will be equal to that lying within the amount of step motor cam lead, (the cam lead shown on drawing is very much exaggerated for illustrative reasons) the bimetal thermal member 21 will come to rest to the right limit position when the step motor 27 is turned counter-clockwise to pin 17 and stop 18, arm 29 will hold U frame out to that travel limit, assuming the terminal screws 25 and 26 are adjusted to the upper end of thermal blade, a limit stop adjusting screw 72 supported in the upper end of post 72', is secured in base 22, and is now adjusted so that bimetal member has just freed the terminal screw 25, this stop screw preventing any further contact with 21 for operating power device in that direction, now turn the step motor rotor clockwise to the opposite limit to the stop pins 17 and 18, this will have moved the bimetal member to the left, post 73' which is secured to base receiving step adjustment graduated head stop screw 73 which is now adjusted against bimetal member 21 just enough to free terminal screw 26 and that will become the travel limit for all the twelve step motor steps in that direction, the graduation indicator point should then indicate 12 steps, this screw is graduated so as to indicate twelve steps, if the screw is then turned in, say to six steps; this would be the step limit of the thermostat step motor 27, the valve regulating step motors 30 and 31 and the power device these would all move only one half their limit in that direction, the two valves would be open but one half their predetermined open limit, or if the screw was adjusted to 0 the bimetal member 21 would be made inoperative; this would be the valve closed position, and could be used as a manual valve closing means.

Applicant's new distributor switch when in circuit with the stator type step motor, only one pair of stator poles are energized, through the use of a pole selector a different pole is energized when movement is reversed and thereby back and forth movement is synchronized. With only one pair of stator poles energized sharp rigid step movement results, the other poles are inactive and can not cause oscillations, over run, et cetera.

As above stated the step indexing ring cam 34 is shown rotating counterclockwise and with it the distributor switch, the rotor in Figures 2, 4, and 7 are shown with a pair of arms 7 aligned with poles of coil B where brush F had previously attracted it, on the step shown as rotation of shaft 40 continues in the counterclockwise direction the segment bar 63 will pass under brush D and energize poles of coil A and will cause rotor arms 7' to be attracted to rotate one twelfth of one revolution clockwise, as shown in Figure 10, a rotor 7' arm now rests aligned with coil A, on further rotation of the distributor in that direction will cause brush E to come in contact with segment bar 63 and cause poles of coil C to be energized and rotate the rotor so that an arm 7 will come to rest over that pair of poles of coil C as is shown in Figure 11, at the end of the step and upon reverse movement of the step indexing ring cam will cause the contact arm 57 to move away from segment 61 because the friction of the brushes D, E and F resting on the distributor disc 58 frictionally resisting it, will cause the arm 57 to contact with segment 60 and drive the disc from the opposite side, changing contact, therefore now segment bar 63 is dead and the segment bar 62 is in the circuit, this will cause the poles of coil A to be energized and thereby bring the rotor arm 7 to align with coil A back again as is shown in Figure 10. It is obvious that the circuit distributor switch as it is shown here in Figure 7 will produce only short impulses for the reason that the heat that the stator coils may generate is reduced to a minimum and be the cause of the least amount of foreign heat in the thermostat, it must be understood that the segment bars 62 and 63 may be any width, which would also serve to hold rotor rigidly in the energized position during each step position until it is ready to be changed into a new position; but it is important that the reversal of the drive movement to take place while the distributor brushes are resting upon an insulated portion of the distributor disc 58 if uniform step spacing is expedient.

Figure 9 shows a diagram of a well known annular type step motor circuit distributing switch, it is shown in connection with my outside four arm rotor consequent pole stator three coil construction, the rotor is shown in the position as it had been attracted by coil B which is in circuit from the distributor segment 78 to brush E, line 75 to coil B then through collector lead 77 to both A and C coils in parallel through line 74 and 76 to brushes D, F, to segment 79, through collector rings, transformer, etc., in other words the coil B is in series circuit with multiple connected coils A and C and therefore have about one half the attractive force of coil B (other resulting inductions set up in the stator not here considered) these coils A and C however are acting against the steady action of the latter, during the short interval that the distributor gap that separate the segments 78 and 79 passes a brush then two single coils are in series circuit with each other, which will cause an intermediate step position for the rotor arms forming a balanced attraction during which time the third brush is dead, therefore with this type of distributor twice as many steps are made for every revolution of a step motor but not accurately spaced, the intermediate step remains only an instant of time, does not have the same torque capacity that the main step has, oscillations due to the different inductions set up in the stator from these oscillations and circuit potency changes make this type of a circuit distributor switch unsatisfactory for producing reliable, uniform impulse circuits for a step motor as is required in my uniform step heat regulator. I am also aware of many improvements that have been made in the step motor circuits including step motor constructions in order to make them more reliable, steady and trouble proof; but for simplicity of construction, reliability, the sharply and accurately spaced steps, and all steps made having the same torque capacity which my circuit selector distributing switch and external rotor step motor makes possible, will make uniform step motors available for manifold uses, at very low cost.

The external step motor rotor arms depending from a radial portion are shown with its ends terminating to a symmetrical angular V point 7'' in parallel alignment with its center line. This serves to increase its sharp rigid centering ability over the respective stator poles. These rotor arms are of an arcuated cross section conforming closely with the periphery of the stator poles for traversing this external magnetic field.

Figure 5 of the drawing shows step motor stator cross section with an eight arm rotor energized and if used with my selector distributor switch this will produce 24 uniform steps for each revolution, it is obvious that the same number of steps may be made with a four arm rotor when it is allowed to rotate two revolutions. Many combinations in the number of rotor arms that can be used, with various combinations of numbers of stator poles, and these poles may be in radial alignment or set at different angular positions, as may be the desire. The three pole stator design shown is very simple and requires but four connecting circuits between the distributor switch and step motor. The rotor shown is a very practical design formed of a single section of soft iron; it is also understood, that when desirable and the cost not prohibitive, a laminated rotor may be provided placing the lamination in line with the flux.

Various modifications and changes may be made in this invention in both the step motor and in the selector circuit distributing switch by those skilled in the art and therefore am only limited in accordance with the scope of the appended claims.

I claim as my invention:

1. In combination with switch means for electric step by step motors, said step motor comprising a stator having at least three pairs of poles disposed around an axis, a rotor journaled upon said axis, said rotor comprising a radially disposed member having a plurality of arms traversing the magnetic circuit of said stator poles, said switching means comprising a current distributor including operating means, electrical connections between said current distributor and said pairs of stator poles energizing means, said current distributor having means for causing electrical impulses for energizing only one of said pairs of stator poles for each step movement so that one rotor arm comes to radial alignment with one of said pairs of stator poles at each stop position, a selector member, said selector member for reversing said rotor movement when said distributor movement is reversed by energizing a different pair of stator poles than the last energized pair of stator poles of the former moving direction for keeping said distributor and said step motor moving back and forth in constant angular pitch.

2. In combination with an electric step by step motor, said step motor comprising a stator having at least three pairs of poles disposed around an axis, a rotor journaled upon said axis, said rotor comprising a radially disposed member having a plurality of arms traversing the magnetic circuit of said stator poles externally forming an open end, a current distributor including operating means, electrical connections between said current distributor and said pairs of poles energizing means, said current distributor having means for causing an electrical impulse for energizing said pairs of stator poles consecutively for moving said rotor in one direction so that at least one rotor arm comes to radial alignment with at least one of said pairs of stator poles when at each of said stop positions, frictionally resisted means for selecting different pairs of stator poles to be energized consecutively when distributor movement is reversed for moving said rotor in the opposite direction and for keeping the back and forth movement of said step motor and said distributor in constant pitch with one other.

3. In combination with an annular type electrical step by step motor, said electric step motor comprising a stator having a minimum of three poles disposed around an axis, a rotor journaled on said axis, said rotor provided with a plurality of tractive members traversing said stator poles magnetic circuit, a current distributor including operating means, electrical energizing connections between said poles and said current distributor, said current distributor for energizing one of said poles for each step of rotor movement, said distributor having a separate movable member for selecting the direction that said rotor shall move by energizing different consecutive stator poles for reverse rotor movement when said distributor is rotated in the opposite direction for keeping said distributor and said rotor movement in constant pitch.

4. In combination with switch means for annular type electrical step by step motors, a step motor, said step motor comprising a stator having a minimum of three poles disposed around an axis, a rotor journaled on said axis, said rotor provided with a plurality of tractive members traversing said stator poles magnetic circuit, a current distributor including operating means, electrical energizing connections between said poles and said current distributor, said current distributor comprising a pair of contacts interposed by a drive member, a frictionally resisted driven member negotiating said pair of contacts for selecting either of said contacts, a plurality of contacts disposed around said driven member for frictionally resisting said driven member for making circuit through said electrical connections for energizing a different one of said stator poles for selecting the direction which said rotor shall move.

5. In an electric step by step motor, said step motor comprising a stator having at least three pairs of poles disposed around an axis, a rotor journaled upon said axis, said rotor comprising a radially disposed member having a plurality of arms externally traversing the magnetic circuit of said pairs of poles, each of said pairs of stator poles provided with one coil radially arranged so that the opposite end of the said pole angular side spaces are free to interposingly receive the adjacent other coil peripheries, said rotor arm plurality number having a different multiple than said stator pole plurality number, a support member, means for securing said stator to said support member, switching means, means for operating said switching means, and electrical connections between said switch means and said stator coils for operating said step motor.

6. In an electric step by step motor, said step motor comprising a stator having at least three pairs of poles disposed around an axis, a rotor journaled upon said axis, said rotor comprising a radially disposed member having a plurality of arms externally traversing the magnetic circuit of said poles forming an open end, each of said pairs of stator poles provided with one coil radially arranged so that the opposite end of the said pairs of poles angular side spaces are free to interposingly receive the adjacent other coils the open end of said rotor arms spanning the magnetic path of said pairs of poles, said rotor arm plurality number having a different multiple than said stator pole plurality number, a support member, means for securing said stator to said support member comprising a shouldered axis sleeve, said stator provided with an aperture aligned with said axis, a spacer sleeve, said support member provided with an aperture for receiving said shouldered axis sleeve after passing through said stator and said spacer sleeve, and means for securing said shouldered sleeve with said stator to said support member, switching means, means for operating said switching means, electrical connections between said switching means and said stator coils for operating said step motor in step by step movement.

LUDWIG HOLLAND-LETZ.